United States Patent [19]
Kondo et al.

[11] Patent Number: 5,191,739
[45] Date of Patent: Mar. 9, 1993

[54] METHOD AND APPARATUS FOR LAPPING GEAR TEETH WHILE CHANGING AT LEAST ONE OF LOAD TORQUE, ROTATING SPEEDS AND RATE OF TEETH CONTACT POINT MOVEMENT OF THE GEARS

[75] Inventors: Norihiko Kondo, Okazaki; Mikio Tsuzuki, Nishio; Yoshinori Miura, Toyota, all of Japan

[73] Assignee: Toyota Jidosha Kabushiki Kaisha, Toyota, Japan

[21] Appl. No.: 622,596

[22] Filed: Dec. 5, 1990

[30] Foreign Application Priority Data

Dec. 7, 1989 [JP] Japan .................. 1-318192

[51] Int. Cl.$^5$ .............................. B24B 37/00
[52] U.S. Cl. .............................. 51/287; 51/26
[58] Field of Search ............. 51/26, 287, 165.71, 51/123, DIG. 1

[56] References Cited

U.S. PATENT DOCUMENTS

| | | | |
|---|---|---|---|
| 2,904,934 | 9/1959 | Schicht | 51/26 |
| 2,947,120 | 8/1960 | Bauer et al. | 51/287 |
| 3,717,958 | 2/1973 | Ellwanger et al. | 51/26 |
| 3,724,042 | 4/1973 | Raess et al. | 29/90 |
| 3,994,098 | 11/1976 | Konersmann et al. | 51/26 |
| 4,788,476 | 11/1988 | Ginir | 318/41 |
| 4,799,337 | 1/1989 | Kotthaus | 51/287 |
| 4,850,760 | 7/1989 | Okunishi et al. | 409/37 |

FOREIGN PATENT DOCUMENTS

| | | | |
|---|---|---|---|
| 61-54416 | 4/1986 | Japan . | |
| 62-236670 | 10/1987 | Japan . | |
| 1-51222 | 2/1989 | Japan . | |
| 1-64718 | 3/1989 | Japan . | |
| 1-71621 | 3/1989 | Japan . | |
| 1-188222 | 7/1989 | Japan . | |
| 1-188223 | 7/1989 | Japan . | |
| 269683 | 8/1970 | U.S.S.R. . | |
| 0510359 | 5/1976 | U.S.S.R. | 51/26 |

Primary Examiner—Robert A. Rose
Attorney, Agent, or Firm—Finnegan, Henderson, Farabow, Garrett and Dunner

[57] ABSTRACT

A method and an apparatus for lapping teeth of a pair of gears by rotating one of the gears in engagement with the other gear, while applying a load torque to the other gear and moving the gears relative to each other such that a teeth contact area of the gears is moved in a direction of width of contacting faces of the teeth of the gears, so that the face of each tooth of the gears is lapped over a substantially entire width thereof. A lapping controller is adapted to change at least one of the load torque applied to the relevent gear, rotating speeds of the gears, and a rate of movement of the teeth contact area of the gears, as the gears are moved relative to each other to move the teeth contact area of the gears in the direction of width of the contacting faces of the gears, so that the gear teeth are lapped efficiently, depending upon the configurations and conditions of use of the gears.

12 Claims, 4 Drawing Sheets

METHOD AND APPARATUS FOR LAPPING GEAR TEETH WHILE CHANGING AT LEAST ONE OF LOAD TORQUE, ROTATING SPEEDS AND RATE OF TEETH CONTACT POINT MOVEMENT OF THE GEARS

BACKGROUND OF THE INVENTION

1. Field of the Invention

The present invention relates in general to a method and an apparatus for lapping or finishing teeth of gears, and more particularly to improvements in such lapping method and apparatus wherein a pair of gears to be lapped are moved relative to each other so as to finish the faces of the gear teeth over the entire width of the faces.

2. Discussion of the Prior Art

For reducing meshing noises of gears, the teeth of the gears are usually lapped so as to improve surface smoothness. In one known lapping process, the faces of the teeth of a pair of gears are finish-lapped over the entire width such that the gears are rotated in meshing engagement with each other, under a loaded condition, while the gears are moved relative to each other so that a teeth contact area of the two gears is moved in the direction of width of the contacting faces of the gear teeth. An example of such a lapping method is disclosed in laid-open Publication No. 64-51222 (published Feb. 27, 1989) of an unexamined Japanese Patent Application, wherein a plurality of lapping cycles are continuously performed, each lapping cycle including a relative movement of the gears to lap the entire width of the tooth faces of the gears.

In the known lapping arrangement wherein a pair of gears are rotated in meshing engagement with each other, a load torque applied to one of the gears, rotating speeds of the gears and a rate of relative movement of the gears are held at predetermined constant values throughout the lapping operation consisting of two or more cycles. This lapping method permits a constant rate of removal of the material over the entire width of the tooth faces of the gears, but does not assure sufficiently high overall lapping efficiency. Further, the known lapping method tend to suffer from overheating of the gears at the end portions of the tooth faces, and tooth interference between the two gears at the non-lapped portions of the teeth when the lapped gears are installed in place for use.

More specifically, the amount of metal that should be removed from the gear teeth differs at different portions of the tooth faces, depending upon the configuration and application condition of the gears to be lapped. In the conventional method as discussed above, the amount of metal removal is constant over the entire width of the tooth faces. Usually, the metal removal amount or lapping depth is set to a largest value that should be theoretically applicable to only a limited area of the tooth faces. This means an unnecessarily long lapping time, since the other areas of the tooth faces does not require such a large amount of metal removal. Further, if the two gears are moved relative to each other such that the actual teeth contact area is reduced from a nominal value at the opposite ends of the width of the tooth faces, the surface pressure at the opposite end portions of the tooth faces is made excessively high, causing an elevated temperature at those end portions, or the metal removal amount is made excessively large at the end portions. On the other hand, if the metal removal amount is unnecessarily large at the central portion of the tooth faces, the amount of backlash of the gears is accordingly increased since it is generally defined by the central portions of the tooth faces. Therefore, when the gears are installed in place with an optimum amount of backlash, the non-lapped portions of the tooth faces of one of the two gears may interfere with the tips of the teeth of the other gear.

SUMMARY OF THE INVENTION

It is therefore a first object of the present invention to provide a method of lapping teeth of a pair of gears, which permits high-quality lapping of the gear teeth with high efficiency.

A second object of the invention is to provide an apparatus suitable for practicing the above method.

The first object may be accomplished according to the principle of the present invention, which provides a method of lapping teeth of a pair of gears by rotating one of the pair of gears in meshing engagement with the other gear, while applying a load torque to the other gear and moving the pair of gears relative to each other such that a teeth contact area of the gears is moved in a direction of width of contacting faces of the teeth of the gears, so that the face of each tooth of the gears is lapped over a substantially entire width thereof, the method comprising a step of changing at least one of the load torque applied to the above-indicated other gear, a rotating speed of the above-indicated one gear, and a rate of movement of the teeth contact area of the gears, while the pair of gears are moved relative to each other to move the teeth contact area of the gears in the direction of width of the contacting faces of the gears.

The second object may be achieved according to another aspect of the present invention, which provides an apparatus for lapping teeth of a pair of gears by rotating one of the pair of gears in engagement with the other gear, while applying a load torque to the other gear and moving the pair of gears relative to each other such that a teeth contact area of the gears is moved in a direction of width of contacting faces of the teeth of the gears, so that the face of each tooth of the gears is lapped over a substantially entire width thereof, the apparatus comprising: (a) a rotating device for rotating the above-indicated one of the pair of gears; (b) a load applying device for applying the load torque to the above-indicated other gear; (c) a positioning device for moving the pair of gears relative to each other; and (d) a controller for changing at least one of the load torque applied to the above-indicated other gear, a rotating speed of the above-indicated one gear, and a rate of movement of the teeth contact area of the gears, while the pair of gears are moved by the positioning device for moving the teeth contact area of the gears in the direction of width of the contacting faces of the gears.

In the method and apparatus of the present invention as described above, at least one lapping condition, namely, at least one of the above-indicated load torque, rotating speed and rate of movement of the teeth contact area is changed as needed, while the gears are moved relative to each other, so that the selected portions of the tooth faces in the direction of width are lapped at a comparatively high rate of removal of the material, depending upon the various parameters, such as the configurations and application conditions of the gears to be lapped. Accordingly, the present lapping method and apparatus assure efficient lapping of the gear teeth.

Since the lapping conditions may be suitably determined for each width portion of the tooth faces, it is possible to prevent an excessively large amount of removal of the material from the central portion of the tooth faces, for example. Therefore, the present method and apparatus permit lapping of the gear teeth so that the lapped gears have a desired amount of backlash when they are installed in place for use, thereby avoiding the otherwise possible interference between the non-lapped portion of the gear teeth of one of the two gears and the tips of the other gear.

The teeth of the gears may be lapped in a plurality of lapping cycles each cycle including a relative movement of the gears to move the teeth contact area over the substantially entire width of the faces of the teeth. In this case, all the lapping cycles need not be performed in the same lapping condition. For example, the load torque may be made larger in the relatively early lapping cycle or cycles (e.g., first lapping cycle) than in the subsequent lapping cycle or cycles (e.g., last lapping cycle), and the rate of movement of the teeth contact area is made lower in the relatively early lapping cycle or cycles than in the subsequent cycle or cycles. According to this arrangement, the gear teeth are lapped efficiently at a comparatively high rate of removal of the material in the first cycle or relatively early cycles, while the lapping is effected at a comparatively high rate of relative movement of the gears, and at a comparatively low rate of the material removal. This assures high lapping efficiency and high surface smoothness of the lapped tooth faces.

While the principle of the present invention requires changing at least one of the load torque, rotating speed and rate of movement of the teeth contact area, all of these three lapping conditions may be preferably changed, for further improvement in the lapping efficiency and quality.

For instance, the load torque and the rotating speed are made respectively smaller and lower when the teeth contact area is located at a central portion of the contacting faces of the teeth than when the teeth contact area is located at an end portion of the contacting faces of the teeth, while the rate of movement of the teeth contact area is made higher when the teeth contact area is located at the central portion of the contacting faces than when the teeth contact area is located at the end portion of the contacting faces. In the case where the gears are moved relative to each other in the direction of width of the contacting faces such that the teeth contact area is reduced from a nominal value at opposite ends of the width of the contacting faces, the load torque and the rotating speed may be made respectively smaller and lower when the teeth contact area is located at each of opposite end portions of the contacting faces than when the teeth contact area is located at a central portion of the contacting faces, and the rate of movement of the teeth contact area may be made higher when the teeth contact area is located at the each of the opposite end portions of the contacting faces than when the teeth contact area is located at the central portion of the contacting faces. This arrangement prevents otherwise possible overheating of the gear teeth at the opposite end portions and/or excessive amount of the material removal at those end portions.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
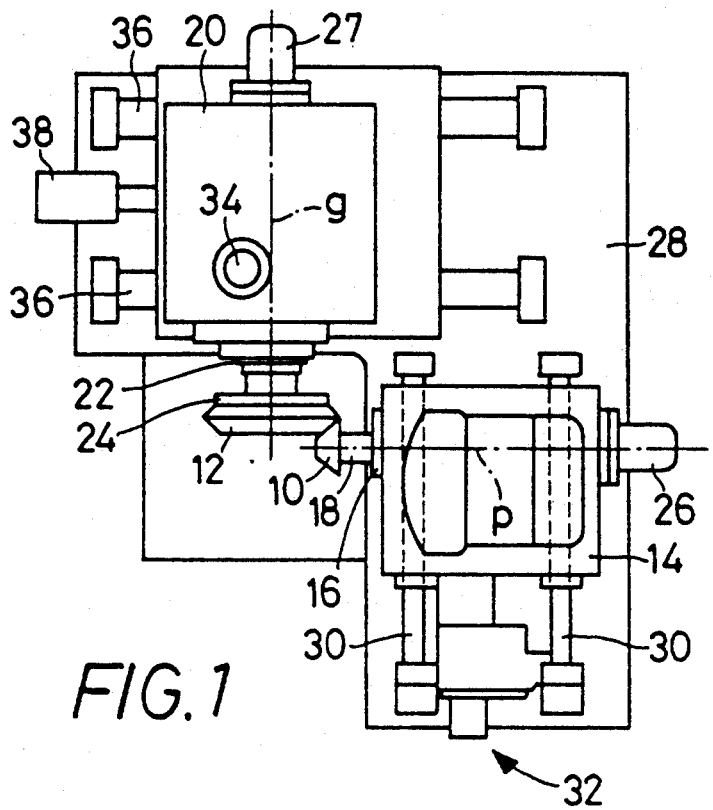
FIG. 1 is a plan view of an example of a gear lapping machine suitable for practicing one embodiment of a gear lapping method of the present invention.

Referring first to FIG. 1, a gear lapping machine shown therein is adapted to lap or finish the tooth faces of a pair of gears 10, 12. The gear 10 is a pinion gear while the gear 12 is a ring gear. For example, these pinion and ring gears 10, 12 are used in meshing engagement with each other, as a hypoid gear in a power transmitting system of an automotive vehicle. The pinion gear 10 is clamped by a chuck 18 held on a drive shaft 16 which is supported by a first gear head 14 such that the drive shaft 16 is rotatable about an axis p. On the other hand, the ring gear 12 is clamped by a chuck 24 held on another drive shaft 22 which is supported by a second gear head 20 such that the drive shaft 22 is rotatable about an axis g.

The two drive shafts 16, 22 are driven by respective bi-directional drive motors 26, 27. In operation, one of the gears 10, 12 is positively driven by the corresponding one of the drive motors 26, 27, while the other gear rotated in meshing engagement with the positively driven gear is in a loaded condition. Namely, a suitable load torque is applied to the above-indicated other gear, by the other motor 26, 27. The rotating directions of the two gears 10, 12 and the gear 10, 12 which is positively driven by the corresponding motor 26, 27 are determined depending upon the direction in which power is transmitted between the two gears when actually installed in place for use. The load torque and the rotating speed of the positively driven gear 10, 12 are regulated by controlling the appropriate motors 26, 27.

The first gear head 14 is slidably supported by a pair of parallel guide rods 30 which are disposed on a base 28 so as to extend in the horizontal plane, in the direction parallel to the rotation axis g of the drive shaft 22. This head 14 is moved by a positioning device 32 while being guided by the guide rods 30, toward and away from the ring gear 12, in the direction parallel to the rotation axis g. The positioning device 32 for the first gear head 14 includes a cylinder for moving the head 14 between a retracted position in which the pinion gear 10 is spaced away from the ring gear 12, and an advanced position in which the pinion and ring gears 10, 12 mesh with each other without a backlash therebetween. The positioning device 32 further includes a feedscrew and a motor for rotating the feedscrew, for moving the first gear head 14 a predetermined suitable small distance from the advanced position toward the retracted position, so as to provide a suitable backlash between the pinion and ring gears 10, 12.

Figure 2:
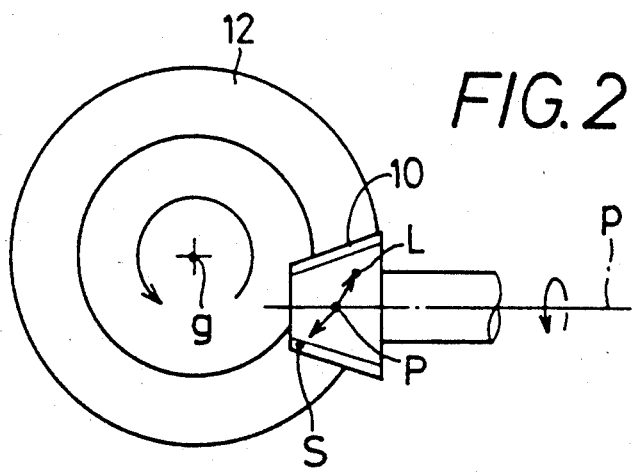
FIG. 2 is an illustration indicating movements of the teeth contact area of a pair of gears to be lapped by the lapping machine of FIG. 1.
Figure 3:
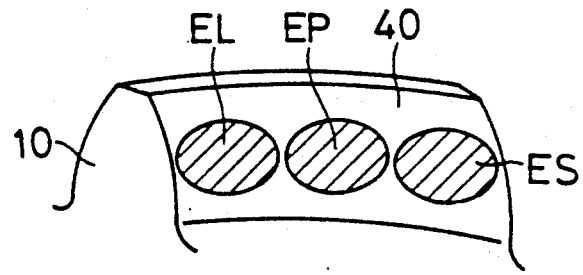
FIG. 3 is a perspective view indicating three different teeth contact areas on the face of a tooth on one of the two gears of FIG. 2.
Figure 4:
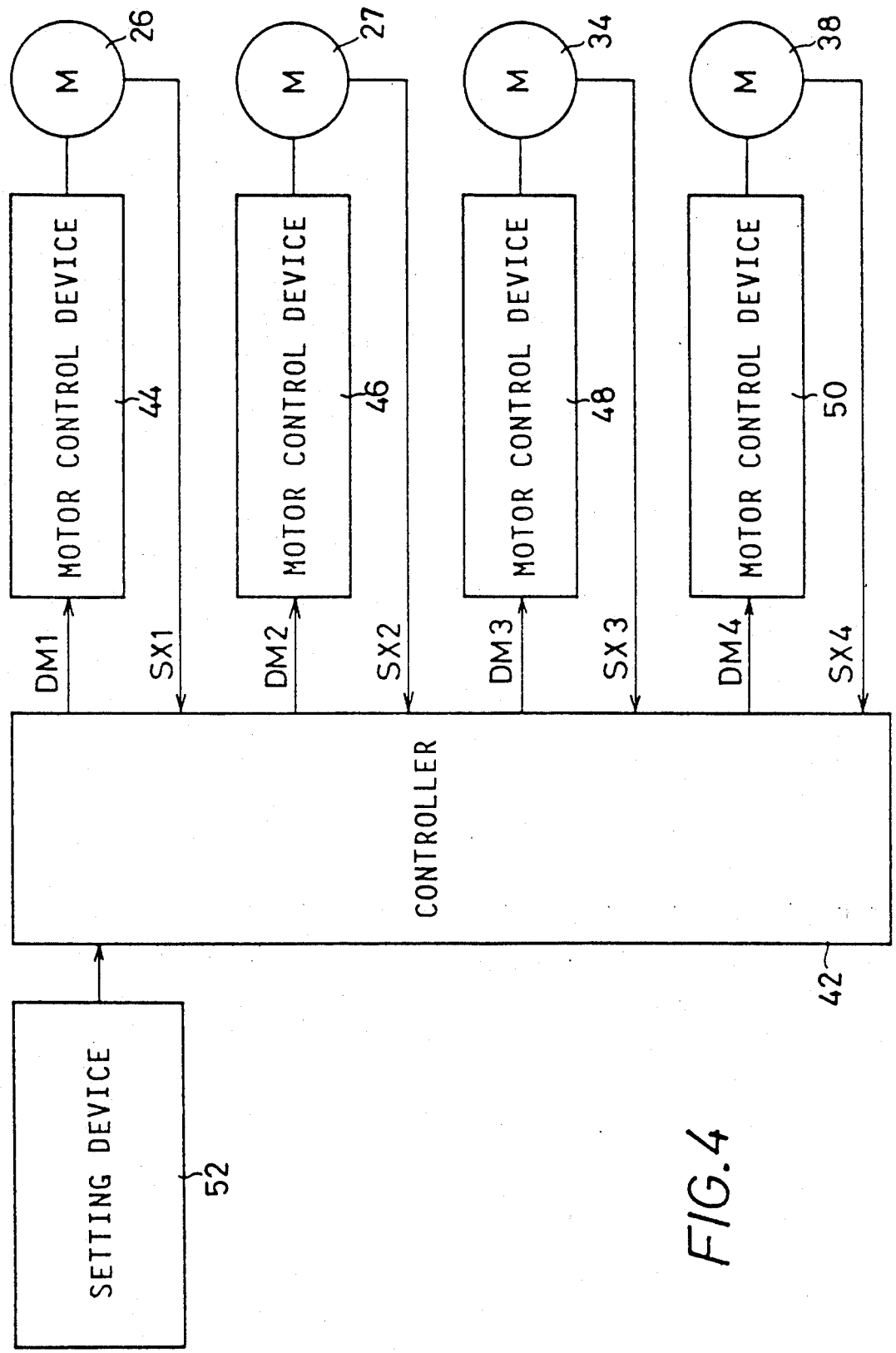
FIG. 4 is a block diagram showing a control system of the gear lapping machine of FIG. 1.

The drive shaft 22 rotatably supported by the second gear head 20 is movable in the vertical direction (in the direction perpendicular to the plane of FIG. 1), by a drive motor 34 through a feedscrew. The second gear head 20 is slidably supported by another pair of parallel guide rods 36 also disposed on the base 28. These guide rods 36 extend in the horizontal plane, in the direction parallel to the rotation axis p of the drive shaft 16 of the first gear head 14. The second gear head 20 is moved by a drive motor 38 through a feedscrew, while being guided by the guide rods 36, in the direction parallel to the rotation axis p. Thus, the drive motors 34, 38 constitute a major portion of a positioning device for moving the ring gear 12 relative to the pinion gear 10, in a vertical plane parallel to the rotation axis p, so that a contact area of the engaging teeth of the two gears 10, 12 may be moved in the direction of width of the contacting faces of the engaging teeth of the gears 10, 12. For example, the ring gear 12 is moved relative to the pinion gear 10 in the above-indicated vertical plane, so that the teeth contact area of the contacting faces of the gears 10, 12 is moved in the direction of width of a face 40 of the tooth of the pinion gear 10, as indicated at EL, EP and ES in FIG. 3, wherein EP represents the position of the tooth contact area of the face 40 when the center of the width of the face 40 of the pinion gear 10 is located at point P aligned with the center of the face width of the ring gear 12, as indicated in FIG. 2, while EL and ES represent the positions of the tooth contact area of the face 40 when the opposite end portions of the face width of the pinion gear 10 indicated at L and S in FIG. 2 are aligned with the opposite end portions of the ring gear 12. The speed of this movement of the ring gear 12 relative to the pinion gear 10, namely, the rate of movement of the teeth contact area of the gears 10, 12 is determined by the operating speeds of the drive motors 34, 38. The tooth contact areas EP, EL, ES on the face 40 of the pinion gear 10 shown in FIG. 3 are those when the pinion gear 10 is positively driven in the direction indicated by arrow in FIG. 2, to rotate the ring gear 12 in the counterclockwise direction as seen in FIG. 2 (also indicated by arrow).

The lapping machine is equipped with a controller 42 which applies drive signals DM1, DM2, DM3 and DM4 to respective motor control devices 44, 46, 48 and 50, to control the drive motors 26, 27, 34, 38, respectively. The motors 26, 27, 34, 38 are provided with respective rotary encoders which generate position signals SX1, SX2, SX3 and SX4. These position signals are indicative of the operating amounts of the corresponding drive motors 26, 27, 34, 38, and are fed back to the controller 42, for controlling the distances of movements of the first and second gear heads 14, 20, i.e., the positions of the pinion and ring gears 10, 12.

The controller 42, which is constituted by a so-called microcomputer, operates to control the motors 26, 27, 34, 38 according to a stored control program, for performing a lapping operation on the pinion and ring gears 10, 12, as described below in greater detail. The lapping conditions are preset by a setting device 52, so that the load torque applied to the ring gear 12, the rotating speed of the positively driven pinion gear 10 and the rate of movement of the teeth contact area of the gears 10, 12 are suitably changed as the two gears 10, 12 are moved relative to each other, depending upon the teeth configuration and application condition (condition of use) of the gears 10, 12. In the present embodiment, the lapping operation is effected in a plurality of cycles (first cycle up to the n-th cycle). In each lapping cycle, the gears 10, 12 are moved such that the tooth contact area of the face 40 of the pinion gear 10 is first moved from the widthwise central position of the tooth face 40 indicated at EP to one widthwise end position (corresponding to the large-diameter end of the gear 10) indicated at EL, then moved in the opposite direction from the position EL to the other widthwise end position (corresponding to the small-diameter end of the gear 10) indicated at ES, past the central position EP, and finally moved from the position ES to the central position EP. Accordingly, the faces of the gears 10, 12 are lapped over their entire widths in each lapping cycle. The lapping cycle is repeated "n" times to lap the gear teeth to the desired surface smoothness with the desired amount of metal removal. It is noted that the lapping conditions, i.e., load torque, rotating speed of the gear 10 and rate of movement of the teeth contact area are preset for each of the lapping cycles.

Figure 5:
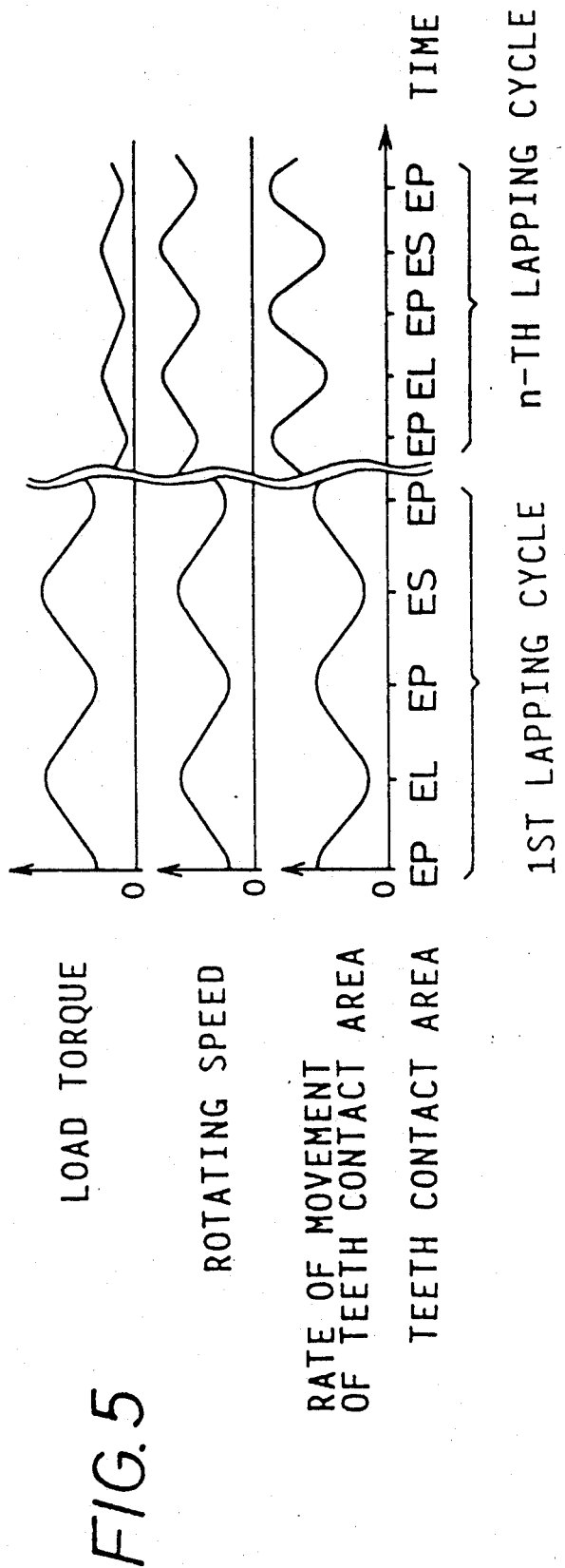
FIG. 5 is a timing chart showing changes in the lapping conditions within a lapping cycle and between different lapping cycles.

An example of the lapping conditions preset by the setting device 52 is illustrated in FIG. 5, which shows the first and the last lapping cycles. In this example, the load torque applied to the ring gear 12 and the rotating speed of the pinion gear 10 are respectively larger and higher when the teeth contact area is located at the opposite end portions of the width of the tooth face 40, as indicated at EL and ES, than when the teeth contact area is located at the central portion of the face width as indicated at EP. Accordingly, the widthwise end portions of the tooth width of the gears 10, 12 are lapped with a larger amount of metal removal than the widthwise central portions. The graph of FIG. 5 also shows that the load torque and the rate of movement of the teeth contact area (rate of relative movement of the gears 10, 12) are respectively higher and lower in the first lapping cycle (and the following cycle or cycles) than in the last lapping cycle (and the preceding cycle or cycles). In other words, the load torque is reduced and the relative movement rate is increased, as the lapping operation progresses from the first cycle to the last cycle, so as to assure the desired surface smoothness of the lapped gear teeth.

In the present lapping machine and method, the lapping conditions are suitably changed as the gears 10, 12 are moved relative to each other to move the teeth contact area in the direction of width of the teeth faces in each lapping cycle, with the specific configuration and application condition of the gears taken into consideration, so that the selected portions of the width of the tooth faces of the gears are lapped with a comparatively large amount of metal removal, for improved lapping efficiency. Further, the load torque given to the ring gear 12 is relatively large and the relative movement speed of the gears 10, 12 is relatively low in the first lapping cycle or relatively early lapping cycles, for efficient lapping operation, and the load torque and the relative movement rate are reduced and increased, respectively, as the lapping operation progresses, so that the gear teeth can be finished to a desired surface smoothness. As a result, the lapping operation is effected relatively efficiently to assure sufficiently high lapping quality. Since the overall lapping time is reduced according to the present arrangement, the required amount of a fluid containing abrasive particles applied to the meshing portions of the two gears 10, 12 can be significantly reduced.

Figure 8:
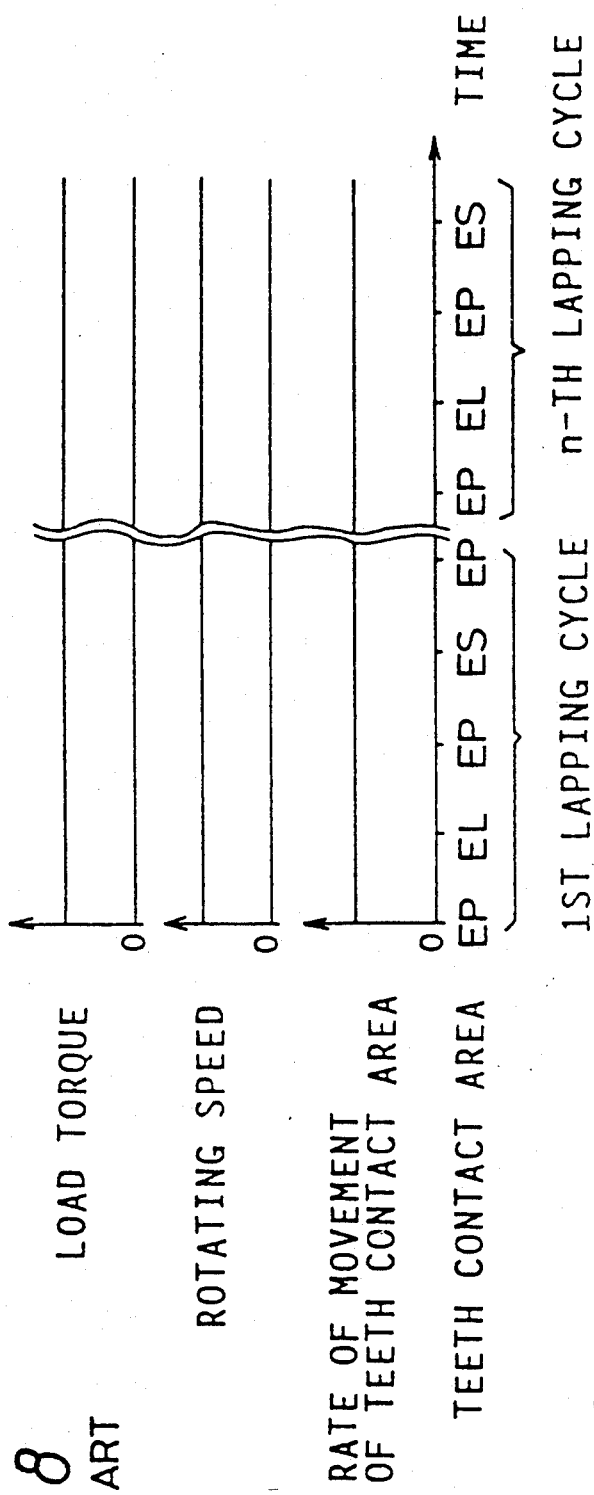
FIG. 8 is a timing chart corresponding to that of FIG. 5, showing the conventional gear lapping method.

In the conventional lapping machine and method, the lapping conditions are kept unchanged throughout the lapping operation, as indicated in FIG. 8, so that the entire area of the tooth faces of the gears is lapped at the same amount or rate of metal removal, which is generally determined by the largest amount of the material that should be removed from the particular area of the tooth faces. This arrangement does not permit efficient and precise lapping operations.

Figure 9:
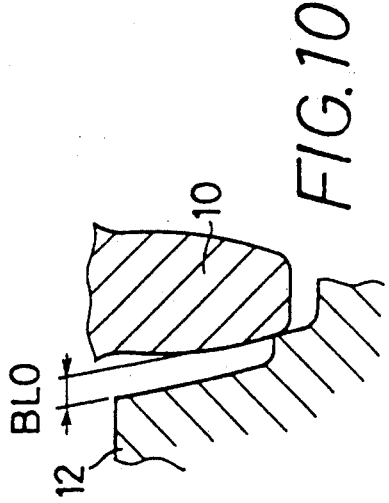
FIG. 9 is a fragmentary cross sectional view indicating an excessively large amount of backlash between the teeth of the two lapped gears.
Figure 10:
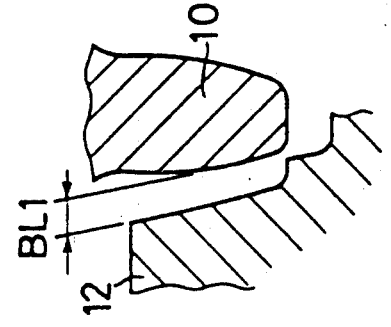
FIG. 10 is a fragmentary cross sectional view indicating an engaging condition of the two gears lapped as indicated in FIG. 9, when the gears are in use with a nominal backlash.

It is also noted that the backlash of the gears 10, 12 lapped by the present lapping machine and method will not be unnecessarily large since the amount of metal removal from the widthwise central portions (indicated at EP in FIG. 3) of the tooth faces is made relatively small. Accordingly, the non-lapped portion of the tooth face of the ring gear 12 and the tip of the lapped tooth of the pinion gear 10 will not interfere with each other when the gears 10, 12 are installed in place for use with a predetermined optimum amount of backlash therebetween. . In the conventional arrangement wherein the amount of metal removal from the central portion of the tooth face of the ring gear 12 is made considerably large, the backlash between the lapped gears 10, 12 as installed on the lapping machine is excessively large as indicated at BL1 in FIG. 9. Consequently, the tip of the tooth of the pinion gear 10 will interfere with the non-lapped area of the tooth of the ring gear 12 when the lapped gears 10, 12 are installed for use with the optimum amount of backlash therebetween as indicated at BL0 in FIG. 10, which is considerably smaller than BL1.

Further, the present lapping arrangement is adapted to change all of the three lapping conditions, namely, load torque applied to the gear 12, rotating speed of the gear 10 and the rate of the relative movement of the gears 10, 12. This arrangement permits efficient lapping of the gear teeth with improved surface finish or smoothness.

Figure 6:
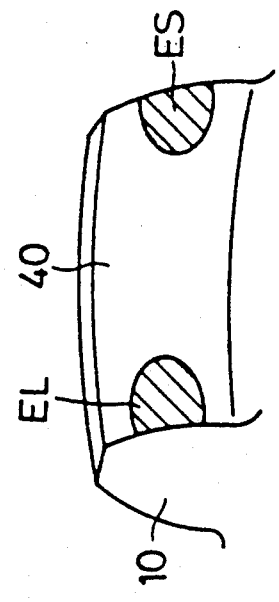
FIG. 6 is a perspective view indicating two incomplete teeth contact areas at opposite ends of the face on the tooth of FIG. 3, in a modified embodiment of the invention.

In the above embodiment, the amount of metal removal from the opposite end portions of the tooth faces of the gears 10, 12 is made comparatively large. However, where the actual teeth contact area is reduced from the nominal value when the contact area is located at the widthwise opposite ends of the tooth face, as indicated in FIG. 6, the load torque and the rotating speed of the gear 10 may be respectively made comparatively small and low, and/or the rate of relative movement of the gears 10, 12 may be made comparatively high, when the contact area of the tooth face of the gears is located at the opposite ends of the tooth face. This modified embodiment of the invention eliminates overheating or excessive amount of metal removal at the ends of the face width of the gears.

While the present invention has been described in its presently preferred embodiments, it is to be understood that the invention may be otherwise embodied.

Figure 7:
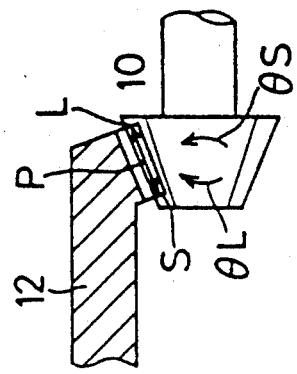
FIG. 7 a view illustrating a further modified embodiment of the present invention.

In the embodiments of FIGS. 1-5 and FIG. 6, only the ring gear 12 is moved relative to the pinion gear 10 as described above while the gears 10, 12 as a hypoid gear are rotated in mesh with each other. However, the pinion gear 10 (rotation axis of the gear 10) may be rotated or oscillated in a horizontal plane including the rotation axis of the pinion gear 10. More specifically, the pinion gear 10 is oscillated by a suitable angle in the direction indicated at $\theta L$ in FIG. 7 while the ring gear 12 is moved relative to the pinion gear 10 from point P to point L, and then in the opposite direction indicated at 8S while the ring gear 12 is moved from point P to point S. In this modified arrangement, the contacting tooth faces of the hypoid gear 10, 12 maintain a substantially constant angle even though the tooth faces are moved relative to each other.

While the illustrated embodiments are adapted to lap the teeth of a pair of gears providing a hypoid gear, the present invention is equally applicable to the lapping of other types of gears such as bevel gears.

In the illustrated embodiments, the pinion and ring gears 10, 12 which are used in meshing engagement with each other are both lapped. However, the present invention may apply to the lapping of one gear, by using another gear as a lap which is rotated together with the gear to be lapped while the two gears are rubbed together as in the illustrated embodiments.

Although the illustrated embodiments are adapted to lap the two gears in a plurality of lapping cycles, the lapping operation may be performed in only one lapping cycle.

It is also possible that different patterns of lapping conditions are used in the different lapping cycles, the same pattern of lapping conditions may be used in all the lapping cycles. In this case, the lapping conditions in each cycle are changed according to the predetermined curves as used in the first cycle of the first embodiment shown in FIG. 5. In this respect, it is noted that the curves along which the lapping conditions are changed in each lapping cycle in the embodiment of FIG. 5 are given for illustrative purpose only, and may be suitably modified depending upon the types and applications of the gears to be lapped.

While all of the three lapping conditions, i.e., torque load applied to the gear 12, rotating speed of the gear 10 and relative movement rate of the gears 10, 12 are changed as the gears are moved relative to each other, the principle of the present invention may be practiced if at least one of the lapping conditions is changed during a lapping cycle. For instance, only the load torque or the load torque and the rotating speed may be changed.

It is to be understood that the present invention may be embodied with various other changes, modifications and improvements which may occur to those skilled in the art, without departing from the spirit and scope of the invention defined in the following claims.

What is claimed is:

1. A method of lapping teeth of a pair of gears comprising the steps of:

rotating one of said pair of gears in engagement with another of said pair of gears while applying a load torque to said another gear;

moving said pair of gears relative to each other during the step of rotating such that a teeth contact area of the gears is moved in a direction of width of contacting faces of the teeth of the gears to lap the face of each tooth of the gears over a substantially entire width thereof; and changing at least one of said load torque applied to said another gear and a rotating speed of said one gear, during the step of moving said pair of gears relative to each other, in a predetermined pattern in synchronization with a movement of said teeth contact area in said direction of width of the contacting faces of the gears.

2. A method according to claim 1 wherein said teeth of said pair of gears are lapped in a plurality of successive lapping cycles, each cycle including a relative movement of said pair of gears to move said teeth contact area over the substantially entire width of the faces of said teeth, said step of applying a load torque including applying a load torque larger in a first one of said plurality of lapping cycles than applied in a last one of said lapping cycles, said step of moving said pair of gears including changing a rate of movement of said teeth contact area to be lower in said first lapping cycle than in said last lapping cycle.

3. A method according to claim 1, further comprising the step of changing the rate of movement of said teeth contact area during moving of said teeth contact area of the gears.

4. A method according to claim 3, wherein said step of changing at least one of said load torque and said rotating speed in said predetermined pattern in synchronization with the movement of said teeth contact area includes changing said load torque and rotating speed to be smaller and lower, respectively when said teeth contact area is located at a central portion of said contacting faces of the teeth than when said teeth contact area is located at an end portion of said contacting faces of the teeth, said step of changing the rate of movement of said teeth contact area including changing said rate of movement of said teeth contact area to be higher when said teeth contact area is located at said central portion of said contacting faces than when said teeth contact area is located at said end portion of said contacting faces.

5. A method according to claim 3, wherein said step of moving the pair of gears relative to each other in the direction of width of said contacting faces includes reducing said teeth contact area from a nominal value at opposite ends of the width of said contacting faces, said step of changing at least one of said load torque and said rotating speed in said predetermined pattern in synchronization with the movement of said teeth contact area includes changing said torque load and said rotating speed to be smaller and lower respectively when said teeth contact area is located at each of opposite end portions of said contacting faces than when said teeth contact area is located at a central portion of said contacting faces, and said step of changing said rate of movement of said teeth contact area includes changing the rate of movement of said teeth contact area to be higher when said teeth contact area is located at each of the opposite end portions of said contacting faces than when said teeth contact area is located at said central portion of said contacting faces.

6. An apparatus for lapping teeth of a pair of gears comprising:

a rotating device for rotating one of said pair of gears in engagement with, another of said pair of gears, a load applying device for applying a load torque to said another gear during rotation of the pair of gears;

a positioning device for moving said pair of gears relative to each other during rotation of the pair of gears, such that a teeth contact area of the gears is moved in a direction of width of contacting faces of the teeth of the gears to lap the face of each tooth of the gears over a substantially entire width thereof; and a controller coupled to at least one of the rotating device and load applying device for changing a corresponding at least one of said load toque applied to said another gear, and a rotating speed of said one gear, during a relative movement of said pair of gears by said positioning device in a predetermined pattern in synchronization with a movement of said teeth contact area of the gears in said direction of width of the contacting faces of the gears.

7. An apparatus according to claim 6, wherein said controller is coupled to control said positioning device to effect a relative movement of said pair of gears in each of a plurality of successive lapping cycles to move said teeth contact area over the substantially entire width of the faces of said teeth, and wherein said controller is coupled to control said load applying device such that said load torque is larger in a first one of said plurality of successive lapping cycles than in a last one of said lapping cycles, and coupled to control said positioning device such that said rate of movement of said teeth contact area is lower in said first lapping cycle than in said last lapping cycle.

8. An apparatus according to claim 6, wherein said controller controls said load applying device, said rotating device, and said positioning device for changing said load torque, said rotating speed and said rate of movement of said teeth contact area, respectively while said pair of gears are moved relative to each other.

9. An apparatus according to claim 8, wherein said controller controls said load applying device and said rotating device such that said load torque and said rotating speed are respectively smaller and lower when said teeth contact area is located at a central portion of said contacting faces of the teeth than when said teeth contact area is located at an end portion of said contacting faces of the teeth, and said controller controls said positioning device such that said rate of movement of said teeth contact area is higher when said teeth contact area is located at said central portion of said contacting faces than when said teeth contact area is located at said end portion of said contacting faces.

10. An apparatus according to claim 8, wherein said controller controls said positioning device to move said pair of gears relative to each other in the direction of width of said contacting faces such that said teeth contact area is reduced from a nominal value at opposite ends of the width of said contacting faces, said controller controls said load applying device and said rotating device such that said load torque and said rotating speed are respectively smaller and lower when said teeth contact area is located at each of opposite end portions of said contacting faces than when said teeth contact area is located at a central portion of said contacting faces, and said controller controls said positioning device such that said rate of movement of said teeth contact area is higher when said teeth contact area is located at said each of the opposite end portions of said contacting faces than when said teeth contact area is located at said central portion of said contacting faces.

11. An apparatus according to claim 1, further comprising the step of changing a rate of movement of said teeth contact area of the gears in said direction of width of the contacting faces of the gears.

12. An apparatus according to claim 6, wherein said controller is connected to said positioning device for changing a rate of movement of said teeth contact area of the gears while said pair of gears are moved relative to each other to move said teeth contact area of the gears in said direction of width of the contacting faces of the gears.

* * * * *

UNITED STATES PATENT AND TRADEMARK OFFICE
CERTIFICATE OF CORRECTION

PATENT NO. : 5,191,739

DATED : March 9, 1993

INVENTOR(S) : Norihiko Kondo et al.

It is certified that error appears in the above-identified patent and that said Letters Patent is hereby corrected as shown below:

Claim 6, column 10, line 17, "toque" should read --torque--.

Claim 11, column 11, line 7, "An apparatus" should read --A method--.

Signed and Sealed this

Thirtieth Day of November, 1993

Attest:

BRUCE LEHMAN

Attesting Officer

Commissioner of Patents and Trademarks